US010599408B2

(12) United States Patent
Songa

(10) Patent No.: US 10,599,408 B2
(45) Date of Patent: Mar. 24, 2020

(54) CUSTOMER INFORMATION CONTROL SYSTEM (CICS) SERVICES DEPLOYMENT SYSTEM

(71) Applicant: Walmart Apollo, LLC, Bentonville, AR (US)

(72) Inventor: Ravi Kiran Songa, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/936,035

(22) Filed: Mar. 26, 2018

(65) Prior Publication Data

US 2018/0285085 A1 Oct. 4, 2018

Related U.S. Application Data

(60) Provisional application No. 62/477,687, filed on Mar. 28, 2017.

(51) Int. Cl.
*G06F 9/44* (2018.01)
*G06F 8/60* (2018.01)
*G06F 11/36* (2006.01)
*G06F 8/77* (2018.01)
*G06F 8/71* (2018.01)
*G06F 8/61* (2018.01)
*H04L 12/24* (2006.01)

(52) U.S. Cl.
CPC .......... *G06F 8/60* (2013.01); *G06F 8/61* (2013.01); *G06F 8/71* (2013.01); *G06F 8/77* (2013.01); *G06F 11/3664* (2013.01); *H04L 41/22* (2013.01)

(58) Field of Classification Search
CPC .................................................. G06F 8/60–65
USPC ................ 717/103–104, 131–132, 140–141
See application file for complete search history.

(56) References Cited

U.S. PATENT DOCUMENTS

| 5,926,817 | A  |   | 7/1999  | Christeson et al. |          |
|-----------|----|---|---------|-------------------|----------|
| 5,960,196 | A  | * | 9/1999  | Carrier, III      | G06F 8/71 |
|           |    |   |         |                   | 707/999.202 |
| 6,226,623 | B1 | * | 5/2001  | Schein            | G06Q 30/02 |
|           |    |   |         |                   | 705/35   |
| 6,321,202 | B1 | * | 11/2001 | Raveis, Jr.       | G06Q 30/02 |
|           |    |   |         |                   | 705/313  |

(Continued)

OTHER PUBLICATIONS

Scheuer et al, "Extracting User Profiles from Large Scale Data", ACM, pp. 1-6, 2010 (Year: 2010).*

(Continued)

*Primary Examiner* — Anil Khatri
(74) *Attorney, Agent, or Firm* — McCarter & English, LLP; David R. Burns

(57) ABSTRACT

Described in detail herein is a Customer Information Control System (CICS) service deployment system. A computing system can render a graphical user interface (GUI) on a display. The computing system can be operatively coupled to servers and a data storage device. The computing system can execute a CICS deployment service. The computing system can instruct the CICS deployment service to render a plurality of CICS services on the GUI. The computing system can receive a selection of CICS services and parameters associated with the CICS services. The computing system can execute a mass compilation, DB2 batch bind and deploy the selected CICS services in the CICS environment.

20 Claims, 5 Drawing Sheets

(56) References Cited

U.S. PATENT DOCUMENTS

| | | | |
|---|---|---|---|
| 6,442,568 B1 | 8/2002 | Velasco et al. | |
| 6,615,166 B1* | 9/2003 | Guheen | G06Q 10/06 703/27 |
| 6,907,546 B1* | 6/2005 | Haswell | G06F 11/3684 714/38.11 |
| 7,051,316 B2* | 5/2006 | Charisius | G06F 8/20 717/101 |
| 7,428,723 B2* | 9/2008 | Greene | G06Q 10/063 112 717/103 |
| 7,559,066 B2* | 7/2009 | Ho | G06F 9/5027 709/246 |
| 7,802,238 B2* | 9/2010 | Clinton | G06F 8/51 717/136 |
| 7,949,992 B2* | 5/2011 | Andreev | G06F 8/10 709/223 |
| 8,041,617 B1 | 10/2011 | Stender | |
| 8,381,197 B2* | 2/2013 | Meenakshisundaram | G06F 11/3664 717/135 |
| 8,429,597 B2* | 4/2013 | Prigge | G06F 8/38 715/771 |
| 8,578,348 B2* | 11/2013 | Fliess | G06F 8/70 717/135 |
| 9,081,747 B1* | 7/2015 | Tabieros | G06F 9/4411 |
| 9,342,351 B1* | 5/2016 | Dee | G06F 9/466 |
| 10,031,739 B1* | 7/2018 | Schindler | G06F 11/3452 |
| 10,397,051 B1* | 8/2019 | Featonby | H04L 41/0813 |

2016/0034593 A1 2/2016 Frerking

OTHER PUBLICATIONS

Roitman et al, "Modeling the Uniqueness of the User Preferences for Recommendation Systems", ACM, pp. 777-780, 2013 (Year: 2013).*

Burg et al, "A Self-Adaptive Deployment Framework for Service-Oriented Systems", ACM, pp. 208-217 (Year: 2011).*

Prywes et al, "Use of a Nonprocedural Specification Language and Associated Program Generator in Software Development", ACM, pp. 196-217 (Year: 1979).*

Bermini et al, "A Software Architecture for the Deployment of Executable Transformation Models", ACM, pp. 47-51 (Year: 2009).*

Khalgui et al, "A heuristic based method for automatic deployment of distributed component based applications", IEEE, pp. 1-10 (Year: 2006).*

CICS Transaction Server from Start to Finish, Redbooks, last viewed Sep. 19, 2016.

Oracle Tuxedo Application Runtime for CICS and Batch Release Notes, Oracle, https://docs.oracle.com/cd/E53645_01/artrt/docs12cr2/relnotes/relnote.html, last viewed Sep. 29, 2016.

COMPILES—The mass-compiler, http://gsfsoft.com/Products/COMPILES.html, last viewed Sep. 29, 2016.

IBM Knowledge Center—Using EXCI sample applications programs, https://www.ibm.com/support/knowledgecenter/SSGMGV_3.1.0/com.ibm.cics.ts31.doc/dfhtm/dfhtmf3.htm, last viewed Sep. 29, 2016.

* cited by examiner

CUSTOMER INFORMATION CONTROL SYSTEM (CICS) SERVICES DEPLOYMENT SYSTEM

CROSS-REFERENCE TO RELATED PATENT APPLICATIONS

This application claims priority to U.S. Provisional Application No. 62/477,687 filed on Mar. 28, 2017, the content of which is hereby incorporated by reference in its entirety.

BACKGROUND

Many CICS services require large amounts of source code. A different environment may be necessary for different CICS services. Deploying a CICS service may require the correct source code, parameters and servers.

SUMMARY

In one embodiment, a code development tool for automatically deploying source code in Customer Information Control System (CICS) environment via a CICS deployment service. The code development tool including a computing system operatively coupled to a plurality of servers and a data storage device. The computing system is programmed to: render a graphical user interface (GUI) on a display, execute a CICS deployment service, instruct the CICS deployment service to render a plurality of CICS services on the GUI. The CICS deployment service, in response to receipt of a selection of CICS services for deployment from the GUI, reads from the data storage device, parameters associated with deployment of the CICS services and source code associated with the CICS services. The computing system is further configured to determine at least one or more available servers from the plurality of servers, execute a mass compilation of the source code in a CICS environment on the one or more available servers and the parameters associated with the deployment of the CICS services to generate compiled CICS services, execute a mass DB2 bind batch in response to the compiled CICS services and deploy the compiled CICS services in the CICS environment in response to completion of the mass DB2 bind batch.

In one embodiment, a method for deploying source code in a CICS environment includes rendering, via a computing system operatively coupled to a plurality of servers and a data storage device, a graphical user interface (GUI) on a display, executing, via the computing system, a CICS deployment service, instructing, via the computing system, the CICS deployment service to render a plurality of CICS services on the GUI, reading, via the computing system, by the CICS deployment service from the data storage device, parameters associated with deployment of the CICS services and source code associated with the CICS services, in response to receipt of a selection of CICS services for deployment from the GUI. The method further includes determining, via the computing system, at least one or more available servers from the plurality of servers, executing, via the computing system, a mass compilation of the source code in a CICS environment on the one or more available servers and the parameters associated with the deployment of the CICS services to generate compiled CICS services, executing, via the computing system, a mass DB2 bind batch in response to the compiled CICS services; and deploying, via the computing system, the compiled CICS services in the CICS environment in response to completion of the mass DB2 bind batch.

BRIEF DESCRIPTION OF DRAWINGS

The accompanying figures, which are incorporated in and constitute a part of this specification, illustrate one or more embodiments of the present invention and, together with the description, help to explain the present invention. The embodiments are illustrated by way of example and should not be construed to limit the present invention. In the figures.

DETAILED DESCRIPTION

Described in detail herein is a Customer Information Control System (CICS) service deployment system. A computing system can render a graphical user interface (GUI) on a display. The computing system can be operatively coupled to servers and a data storage device. The computing system can execute a CICS deployment service. The computing system can instruct the CICS deployment service to render a plurality of CICS services on the GUI presented to a user. A user can select CICS services and parameters associated with CICS services. The GUI 100 can transmit a selection of CICS services and parameters associated with the CICS services to the computing system. The computing system can receive the selection of the CICS services and the parameters associated with the CICS services. The computing system can read, via the CICS deployment service from the data storage device, other parameters associated with deployment of the CICS services and source code associated with the CICS services. The computing system can determine at least one or more available servers from the plurality of servers or alternatively the computing system can determine the availability of the servers selected on the GUI. The computing system automatically execute a mass compilation of the source code in a CICS environment on the one or more available servers and the parameters associated with the deployment of the CICS services to generate compiled CICS services. The computing system can automatically execute a mass DB2 bind batch in response to the compiled CICS services. The computing system can deploy the compiled CICS services in the CICS environment in response to completion of the mass DB2 bind batch.

Figure 1:
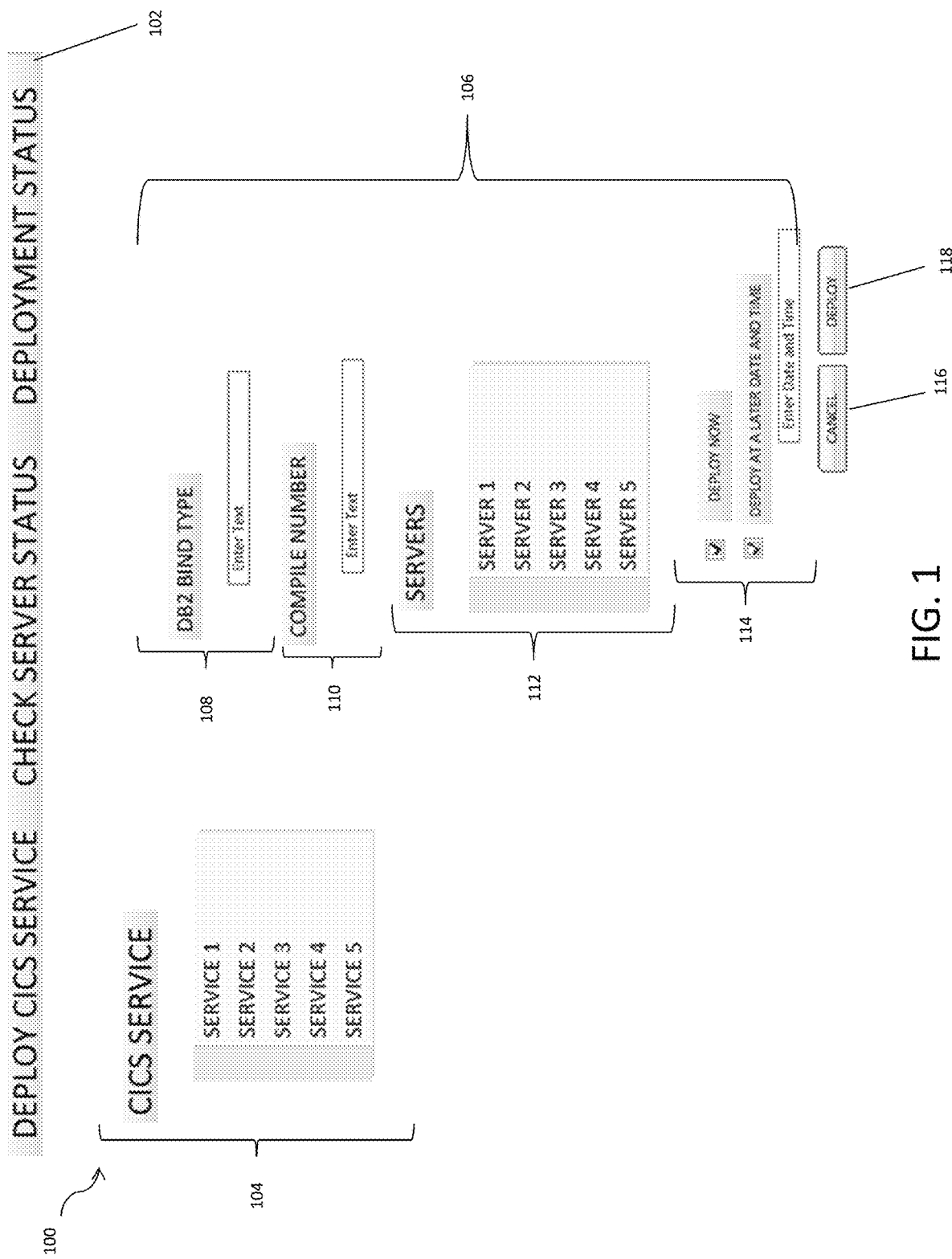
FIG. 1 is a block diagram of a graphical user interface (GUI) for deploying CICS services in accordance with an exemplary embodiment.

FIG. 1 is a block diagram of a graphical user interface (GUI) for deploying CICS services in accordance with an exemplary embodiment. In exemplary embodiments, a deployment web-service 208 can render a GUI 100 on a display. The deployment web-service 208 is discussed in further detail with respects to FIGS. 2-3. The GUI 100 can include a main menu 102. The main menu 102 can include a GUI element, for example, a tab or button to deploy an identified CICS service, check server status, and determine a deployment status. Selection of deploy a CICS service element by the user allows deployment of a CICS service in a CICS environment. Selection of the check status of servers element by the user searches for available servers for deployment of the CICS services. Selection of the deployment status element by the user checks for any errors of an already deployed CICS service.

As mentioned above, the deploy a CICS service element can be selected to deploy a CICS service in a CICS environment. In response to selecting the deploy CICS service element the GUI 100 can display input requirements for the selected CICS service. The input requirements can include a dropdown menu displaying multiple CICS services 104. A CICS service, for example, can be a mixed language application that provides online transaction management, for example, on an IBM mainframe. One or more of the CICS services 104 can be selected from the dropdown menu.

The GUI 100 can also include input boxes for parameters 106 associated with the selected CICS service(s). For example, the parameters 106 can include text input box of DB2 Bind Type and Compile Number 110. A DB2 Bind Type and Compile Number 110 can be entered in the respective text boxes. The Compile Number 110 entered in the input text box can be the compile number associated with the source code of the selected CICS service(s). The DB2 Bind type entered in the text box can be the type of DB2 Bind to execute on the compiled source code of the CICS service(s), as will be described herein. The parameters 106 can also include a dropdown menu of servers 112. The dropdown menu of servers 112 can include a selection of different servers identified by different server names. The selected CICS service(s) can be deployed on the selected servers from the dropdown menu. The GUI 100 can also include check box input boxes for deploying now or deploying at a later date and time 114. The deploying at a later date and time selection can also include a text input box to enter date and time. The deploy now selection can indicate the preference of deploying selected CICS service(s) as soon as possible. The deploy later selection can indicate the preference of deploying at a specified date and time.

The GUI 100 can also include a Cancel 116 and a Deploy 118 button. The Cancel button 116 can clear all of the selections made on the GUI 100. The Deploy button 118 can be selected to submit all of the selections. Once selecting the Deploy button 118 the selected CICS service(s) can automatically be deployed in a CICS environment based on the parameters selected without any further user interaction. The GUI 100 can transmit the selections to a computing system. The computing system will be described in further detail with respect to FIGS. 2-4.

In some embodiments, the input boxes displayed on the GUI 100 can be required fields, while other input boxes can be optional fields. For example, the Compile number 110 and DB2 Bind Type may be required fields, while the dropdown menu of the servers 112 can be an optional field. For example, the servers can be automatically selected for deploying the selected CICS services. In response to, selecting the Deploy button 118, the GUI 100 can confirm the required fields have been completed.

Figure 2:
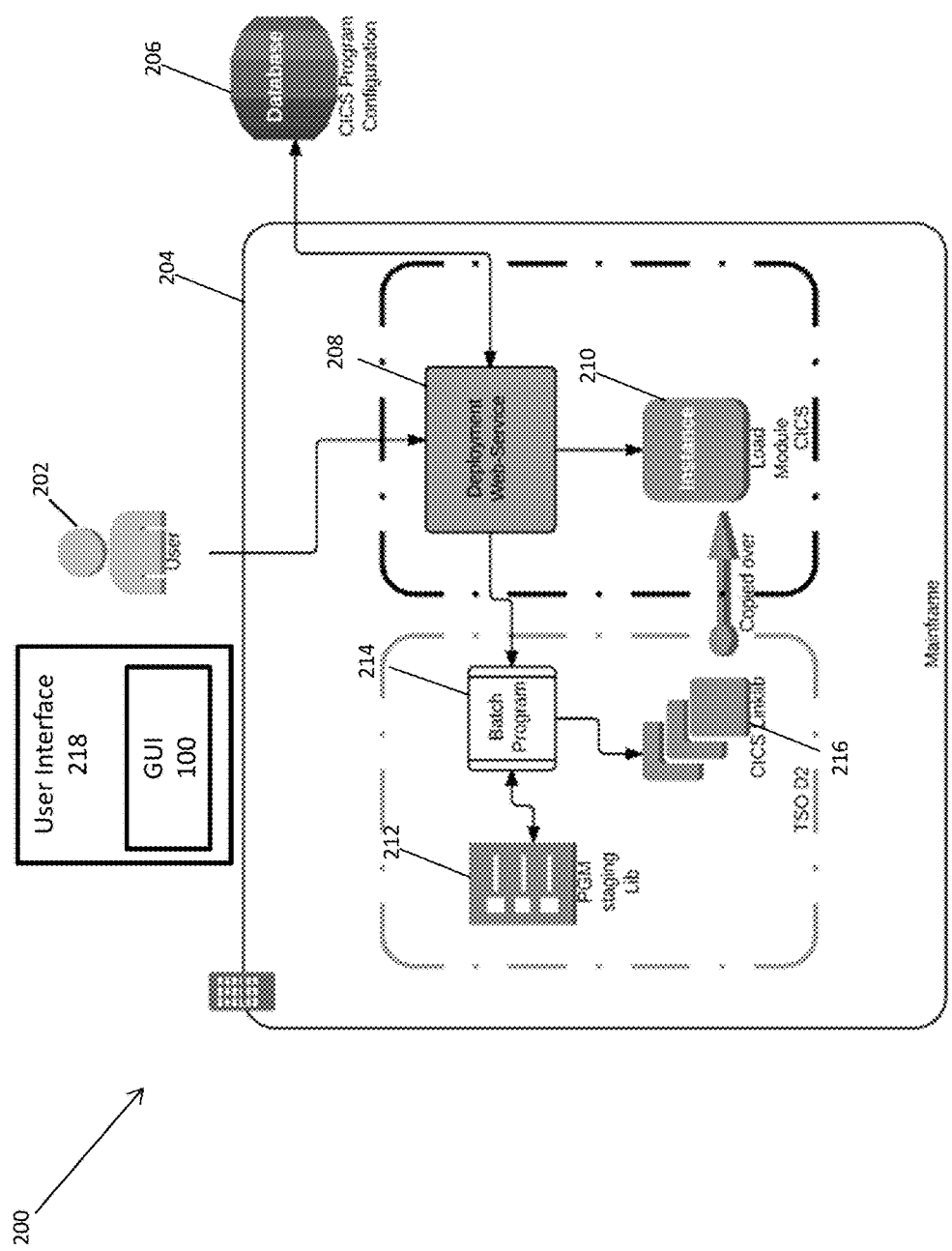
FIG. 2 is a block diagram of a CICS service deployment system in accordance with an exemplary embodiment.

FIG. 2 is a block diagram of a CICS service deployment system in accordance with an exemplary embodiment. The CICS service deployment system 200 can include a database 206 storing multiple configurations and a computing system 204. The multiple configurations, as an example, can include, different environments for deploying CICS services, databases storing various types of data, pre-existing configurations for current versions of the selected CICS services currently deployed, and other configuration details needed to deploy CICS services. The computing system 204 can be a mainframe. The computing system 204 can store and execute a deployment web service 208, an instance load module 210, a staging lab 212, a batch program 214 and a link library 216. The computing system 204 is discussed in further detail with respect to FIGS. 3-4.

The computing system 204 can execute the deployment web-service 208 on a user interface 218 of a user device. The computing system 204 can deploy the deployment web-service 208. The deployment web-service 208 can render a GUI 100 on the user interface 210. The deployment web-service 208 is a combination of online and batch tools. The deployment web-service 208 can use the combination and batch tools to deploy web-applications. The deployment web-service 208 can be configured to execute mass-compiles and mass-binds of source code of an web-service and to deploy web-services on web servers. The deployment web-service 208 can deploy web-services with multiple different configurations. The computing system 204 can receive a selection of a CICS services (and/or modules) for deployment in a CICS environment and parameters associated with the selected CICS services, via the GUI 100 (as described in FIG. 1). The parameters can the include number of servers required, the type of data required, the compile number, the type of DB2 bind required and a date and time of desired deployment.

In response to receiving the selection of the CICS services and the parameters associated with the CICS services the deployment web-service 108 can retrieve a program configuration from the database 206 based on the selection of the CICS services and the parameters associated with the CICS services. The program configuration can include the type of data needed for the deployment for the selected CICS services, the servers for deploying the CICS services, and any other types of configurations needed for deploying the CICS services. The deployment web-service 208 can also retrieve the source code associated with the selected CICS service.

The deployment web-service 208 can transmit the retrieved source code, retrieved configuration and received parameters to the batch program 214. The batch program 214 can retrieve a staging environment from the PGM staging Library 212. The deployment web-service 108 can instruct the batch program 214 can automatically execute a mass-compilation using the source code, retrieved configuration, received parameters and staging environment. In response to the mass-compilation, the deployment web-service 208 can instruct the batch program 214 to execute a mass-bind. For example, the batch program 214 can execute a mass DB2 bind. In response to a the mass-compilation and mass bind, the deployment web-service 208 can deploy the selected CICS services in the appropriate CICS environment.

The batch program 214 can transmit the compiled source code to the CICS Link Library 216. The CICS Link Library 216 can generate a copy of the compiled source code and transmit a copy of the compiled source code to the load module 210. The compiled source code can be retrieved the next time the respective CICS services are selected to deployed.

Figure 3:
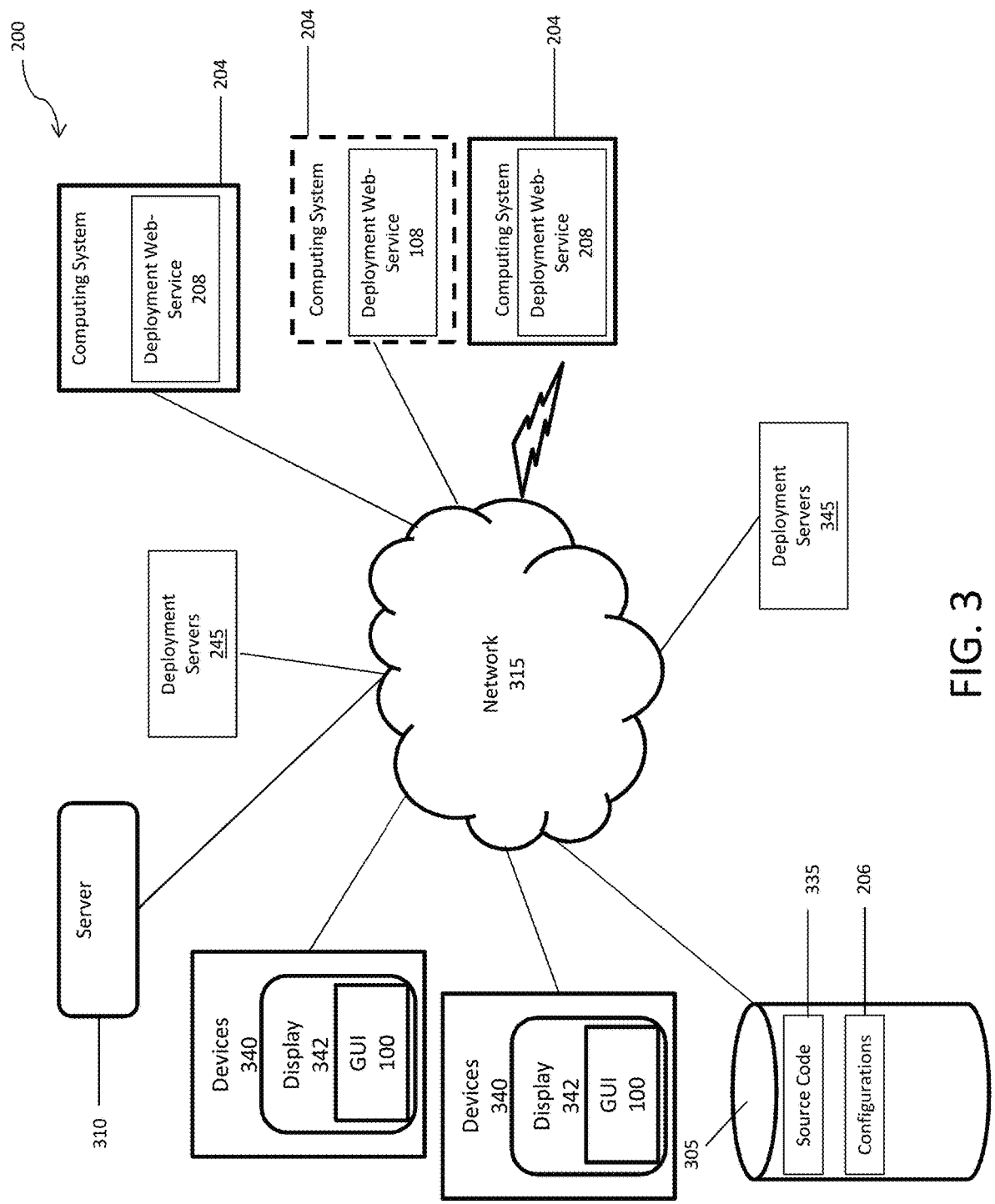
FIG. 3 is a distributed computing environment diagram of the CICS service deployment system according to an exemplary embodiment.

FIG. 3 illustrates an distributed computing environment of the CICS service deployment system 200. The CICS service deployment system 200 can include a database 305, one or more of computing systems 204, one or more user devices 340 and one or more development servers 345. In one exemplary embodiment, the computing system 304 can be in communication with the database(s) 305, one or more user devices 340 and one or more development servers 345, via a communications network 315. The user device 340 can include a display 342. The computing system 204 can implement an instance of the deployment web-service 208. The deployment web-service 208 can be a executable residing on the computing system 204. The deployment web-service 208 can implement the process of the CICS deployment system 200 as described herein.

In an example embodiment, one or more portions of the communications network 215, can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The computing system 204 includes one or more computers or processors configured to communicate with the databases 305, servers 310, user device 340 and deployment servers 345 via the network 315. The computing system 304 hosts one or more applications configured to interact with one or more components of the CICS service deployment system 200. The databases 305 may store information/data, as described herein. For example, the databases 305 can include a configurations database 206, and a source code database 335. The configurations database 206 can include configuration settings for various CICS services. The source code database 335 can include source code associated with various CICS services. The databases 305 and server 310 can be located at one or more geographically distributed locations from each other or from the computing system 204. Alternatively, the databases 205 can be included within server 310 or computing system 204.

In exemplary embodiments, the deployment web-service 108 can render a GUI 100 on a display 342 of the user device 340. The GUI 100 can include various CICS services. A user can select one or more CICS services on the GUI 100. The user can also input parameters associated with the CICS services on the GUI. The user device 340 can transmit the selected CICS services and the parameters associated with the CICS services to the computing system 104.

The deployment web-service 208 can receive the selection of CICS services and the parameters associated with the CICS services. The parameters can be the number of servers required, the type of data required, the compile number, the type of DB2 bind required and a date and time of desired deployment. The deployment web-service 208 can query the configurations database 206 to retrieve appropriate configuration settings for the selected CICS services and parameters associated with the CICS services. For example, the parameters associated with the CICS servers can include deploying the selected CICS services in a test CICS environment. The deployment web-service 108 can retrieve configuration settings associated with the appropriate test environment, such as the appropriate test data, the test environment and the test servers for the selected CICS services.

The deployment web-service 208 can also retrieve the source code from the source code database 335. The source code can be associated with the selected CICS services. The source code can be the most up to date source code available for the CICS services. In one example, the user can be a developer who has just updated a portion of the source code and is intending to deploy the CICS service with the updated source code. In another example, the user can request to deploy an old version of the source code. The deployment web-service 208 can transmit the retrieved source code, the parameters and the configuration settings to a batch program. The batch program can execute a mass-compilation of the source code based on the parameters and configuration settings and execute a mass-bind based on the parameters and configuration settings. The batch program can determine an available deployment server 340. The batch program can deploy the selected CICS services on the available deployment server 345 in response to the mass-compilation and the mass-bind. The deployment web-service 208 can transmit a success message to be rendered on the GUI 100 in response to successfully deploying the CICS services. The batch program can transmit the compiled source code to a CICS Link Library which an generate a copy of the compiled source code and store the compiled source code in load module.

In some embodiments, the parameters received from the user device 340 can include a specified deployment server for deploying the CICS services. The batch program can determine the availability of the specified deployment server 245. In response to the deployment server 340 being available the batch program can deploy the CICS services on the specified deployment server 345. In the event the specified deployment servers 345 are not available, the batch program can transmit a message to the deployment web-service 208. The deployment web-service 208 can render the message on the graphical user interface on the display of the device 340. The message can request the user to select new deployment servers including a list of the available deployment servers or request the user to select to execute the CICS services at a different date and time, including a list of the available date and times for the specified deployment server 345.

In some embodiments, the parameters can include a specified date and time to deploy the CICS services. For example, a user may only want to run a test at a certain time of the day. Accordingly, the batch program can wait for the specified date and time to deploy the CICS services.

In the event the batch program detects an error with the mass-compilation and/or mass-bind the batch program can transmit a message to the deployment web-service 208. The message can include the detected error. The deployment web-service 108 can render the error on the graphical user interface on the GUI 100.

In some embodiments, the user device 340 can transmit a request to check whether specified servers are available. The deployment web-service can check the availability of the deployment servers 245. The deployment web-service 108 can render the availability of all the deployment servers based on date and time frames of availability.

As a non-limiting example, the CICS service deployment system 200 can be implemented in a retail store environment or an e-commerce system. The computing system 204 can deploy CICS services associated with financial transactions that are executed in-store or on an online store.

Figure 4:
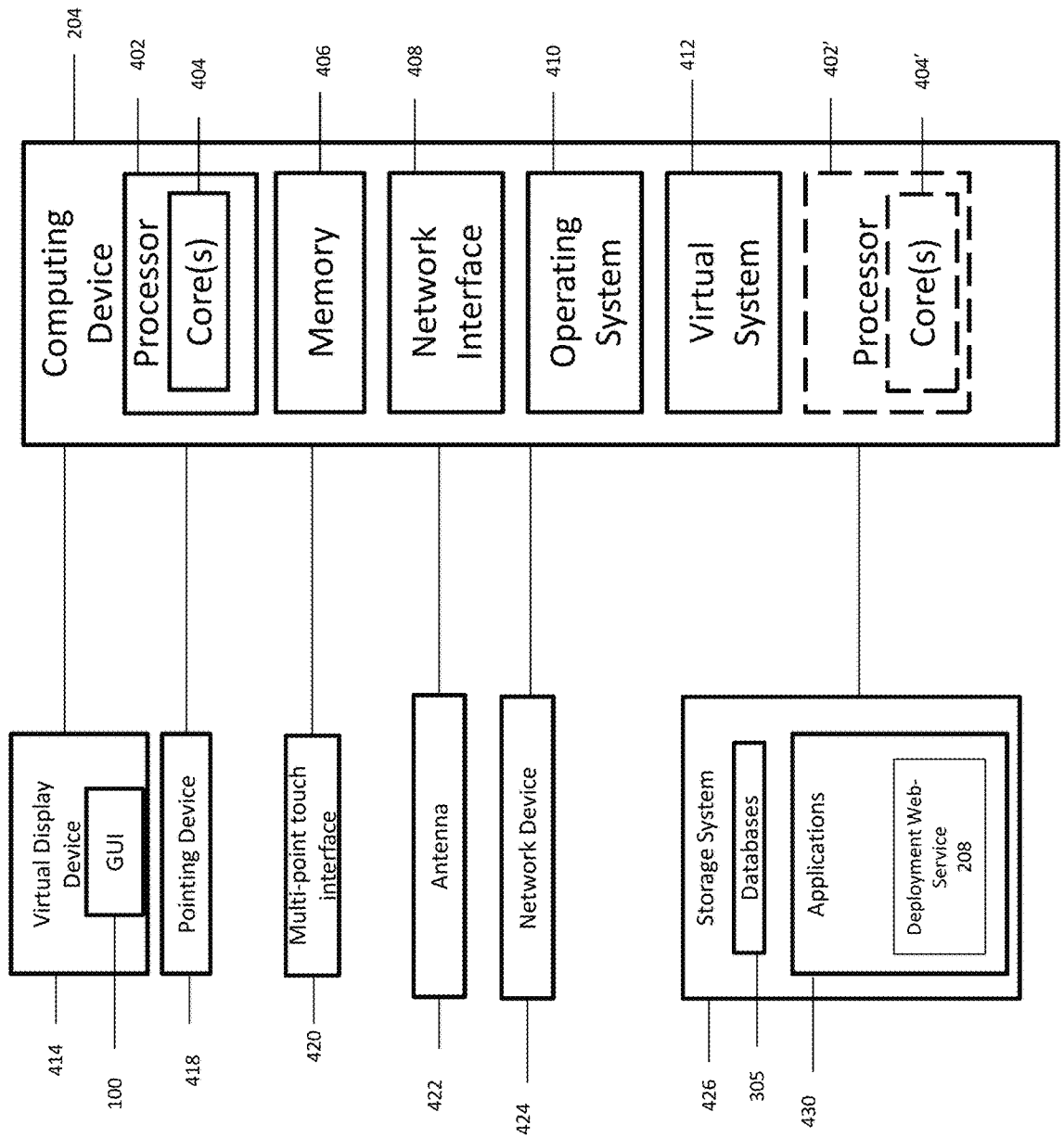
FIG. 4 is a block diagram illustrating an exemplary computing device in accordance with an exemplary embodiment.

FIG. 4 is a block diagram of an example computing device for implementing exemplary embodiments. The computing device 204 can implement embodiments of the CICS service deployment system 200. The computing device 204 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 406 included in the computing device 204 may store computer-readable and computer-executable instructions or software (e.g., applications 430 such as the deployment web-service 208) for implementing exemplary operations of the computing device 204. The computing device 204 also includes configurable and/or programmable processor 402 and associated core(s) 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for implementing exemplary embodiments. Processor 402 and processor(s) 402' may each be a single core processor or multiple core (404 and 404') processor. Either or both of processor 402 and processor(s) 402' may be configured to execute one or more of the instructions described in connection with computing device 204.

Virtualization may be employed in the computing device 204 so that infrastructure and resources in the computing device 204 may be shared dynamically. A virtual machine 412 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, EDO RAM, and the like. Memory 406 may include other types of memory as well, or combinations thereof.

A user may interact with the computing device 204 through a visual display device 314, such as a computer monitor, which may display the graphical user interfaces 100. The graphical user interface 100 can be generated by the deployment web-service as discussed above. The computing device can include input/output devices such as multi touch interface 420, a keyboard and a pointing device 418.

The computing device 204 may also include one or more storage devices 426, such as a hard-drive, CD-ROM, or other computer readable media, for storing data and computer-readable instructions and/or software that implement exemplary embodiments (e.g., applications such as the deployment web-service 208). For example, exemplary storage device 426 can include one or more databases 305 for storing information regarding configuration settings and source code for CICS services. The databases 305 may be updated manually or automatically at any suitable time to add, delete, and/or update one or more data items in the databases.

The computing device 204 can include a network interface 408 configured to interface via one or more network devices 424 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 422 to facilitate wireless communication (e.g., via the network interface) between the computing device 204 and a network and/or between the computing device 204 and other computing devices. The network interface 408 may include a built-in network adapter, network interface card, PCMCIA network card, card bus network adapter, wireless network adapter, USB network adapter, modem or any other device suitable for interfacing the computing device 204 to any type of network capable of communication and performing the operations described herein.

The computing device 204 may run operating system 410, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on the computing device 204 and performing the operations described herein. In exemplary embodiments, the operating system 410 may be run in native mode or emulated mode. In an exemplary embodiment, the operating system 410 may be run on one or more cloud machine instances.

Figure 5:
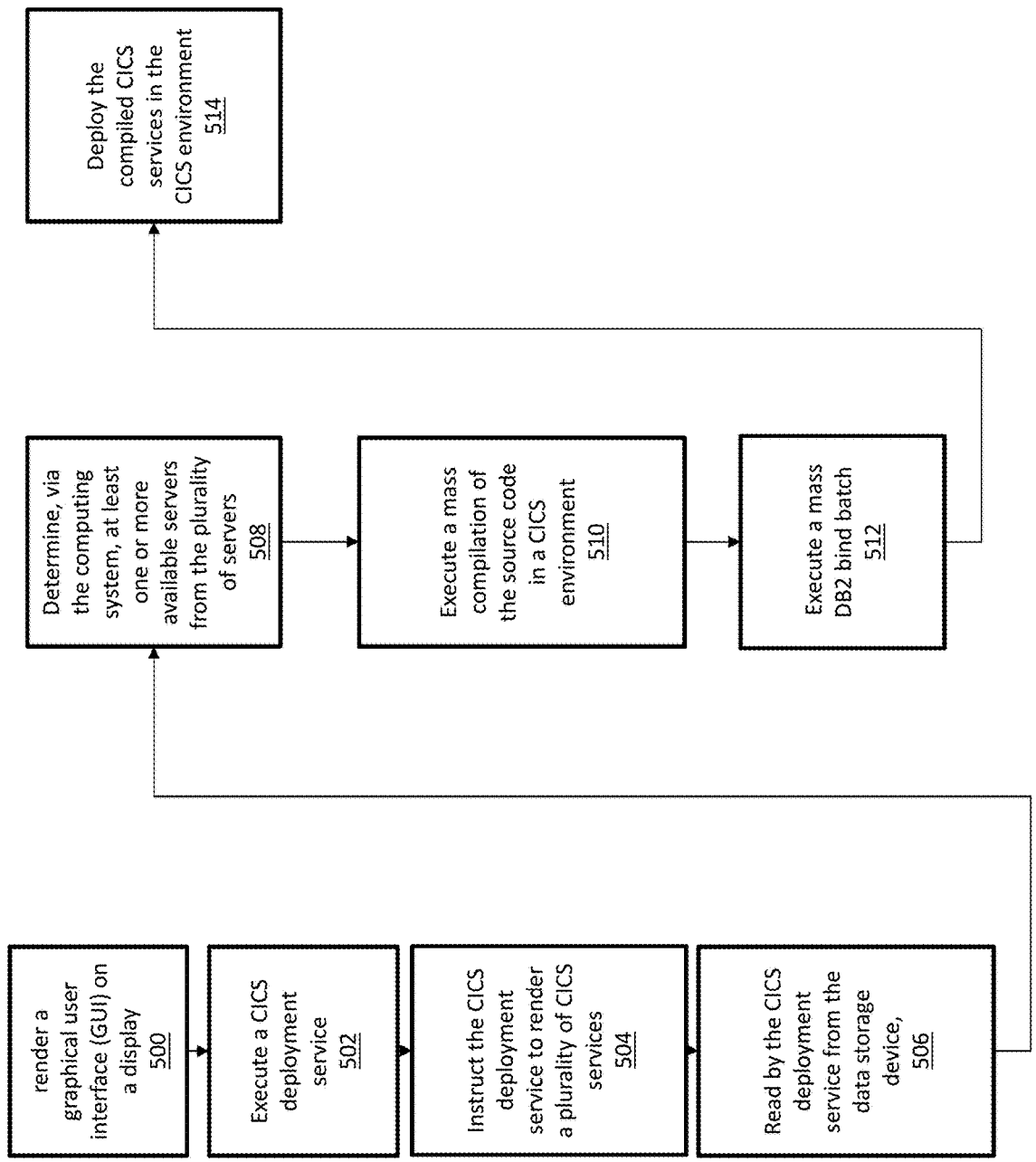
FIG. 5 is a flowchart illustrating an exemplary process performed in a CICS service deployment system according to an exemplary embodiment.

FIG. 5 is a flowchart illustrating an exemplary process performed in a CICS service deployment system according to an exemplary embodiment. In operation 500, a computing system (e.g. computing system 204 as shown in FIGS. 1-4) can render a graphical user interface (GUI) on a display. The computing system can be operatively coupled to servers (e.g. deployment servers 345 and server 310 as shown in FIG. 3) and a data storage device (e.g. configurations database 206 as shown in FIGS. 2-3 and source code database 335 as shown in FIG. 3). In operation 502, the computing system can execute a CICS deployment service (e.g. deployment web-service 208 as shown in FIG. 2-3). In operation 504, the computing system can instruct the CICS deployment service to render a plurality of CICS services on the GUI. In operation 506, in response to receipt of a selection of CICS services for deployment from the GUI, the computing system can read, via the CICS deployment service from the data storage device, parameters associated with deployment of the CICS services and source code associated with the CICS services. In operation 508, the computing system can determine at least one or more available servers from the plurality of servers. In operation 510, the computing system can execute a mass compilation of the source code in a CICS environment on the one or more available servers and the parameters associated with the deployment of the CICS services to generate compiled CICS services. In operation 512, the computing system can execute a mass DB2 bind batch in response to the compiled CICS services. In operation 514, the computing system can deploy the compiled CICS services in the CICS environment in response to completion of the mass DB2 bind batch.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present invention. Further still, other aspects, functions and advantages such as different combinations of the described embodiments are also within the scope of the present invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

I claim:

1. A code development tool for automatically deploying Customer Information Control System (CICS) services in a CICS environment, the code development tool comprising:
a computing system operatively coupled to a plurality of servers and a data storage device, programmed to:
execute a CICS deployment service that displays a list of a plurality of CICS services on a GUI rendered on a display;
receive with the CICS deployment service a selection of a CICS service for deployment, the selection selected from the list of the plurality of CICS services displayed on the GUI;
read, from the data storage device, parameters associated with deployment of the CICS service and source code associated with the CICS service;
determine at least one or more available servers from the plurality of servers;
execute a mass compilation of the source code in a CICS environment on the one or more available servers and the parameters associated with the deployment of the selected CICS service to generate a compiled CICS service;
execute a mass Relational Database Management System (RDBMS) bind batch in response to the compiled CICS service; and
deploy the compiled CICS service in the CICS environment in response to completion of the mass RDBMS bind batch.

2. The code development tool of claim 1, wherein the parameters associated with the deployment of the selected CICS service is one or more of: number of servers required, the type of data required, the compile number, the type of RDBMS bind required and a date and time of desired deployment.

3. The code development tool of claim 1, wherein the computing system is further programmed to:
detect one or more errors in response to executing the mass compilation of the source code or in response to executing the mass RDBMS bind.

4. The code development tool of claim 3, wherein the computing system if further programmed to instruct the CICS deployment service to render the one or more errors on the GUI.

5. The code development tool of claim 1, wherein the computing system is programmed to:
receive, via the GUI, a request for a list of available servers at a specified date and time;
determine from the plurality of servers the servers available at the specified date and time;
generate a list of the determined available servers at the specified date and time;
instruct the CICS deployment service to render the list on the GUI.

6. The code development tool of claim 1, wherein the computing system is further programmed to transmit a success message in response to not detecting any errors during the execution of the mass compilation of the source code and the execution of the mass RDBMS bind.

7. The code development tool of claim 1, wherein the computing system is further configured to generate a copy of the compiled source code.

8. A method for deploying source code in a CICS environment, the method including:
executing, via a computing system, a CICS deployment service that displays a list of a plurality of CICS services on a graphical user interface (GUI) rendered on a display;
receive with the CICS deployment service a selection of a CICS service for deployment, the selection selected from the list of the plurality of CICS services displayed on the GUI;
reading, via the CICS deployment service, parameters associated with deployment of the selected CICS service and source code associated with the selected CICS service from a data storage device,
determining, via the computing system, one or more available servers from a plurality of servers;
executing, via the computing system, a mass compilation of the source code in a CICS environment on the one or more available servers and the parameters associated with the deployment of the selected CICS service to generate a compiled CICS service;
executing, via the computing system, a mass Relational Database Management System (RDBMS) bind batch in response to the compiled CICS service; and
deploying, via the computing system, the compiled CICS service in the CICS environment in response to completion of the mass RDBMS bind batch.

9. The method of claim 8, wherein the parameters associated with the deployment of the selected CICS service is one or more of: number of servers required, the type of data required, the compile number, the type of RDBMS bind required and date and time of desired deployment.

10. The method of claim 8, further comprising:
detecting, via the computing system, one or more errors in response to executing the mass compilation of the source code or in response to executing the mass RDBMS bind.

11. The method of claim 10, further comprising:
instructing, via the computing system, the CICS deployment service to render the one or more errors on the GUI.

12. The method of claim 8, further comprising:
receiving, via the computing system, from the GUI a request for a list of available servers at a specified date and time;
determining, via the computing system, the servers from the plurality of servers available at the specified date and time;
generating, via the computing system, a list of the determined available servers at the specified date and time;
instructing, via the computing system, the CICS deployment service to render the list on the GUI.

13. The method of claim 8, further comprising:
transmitting, via the computing system, a success message in response to not detecting any errors during the execution of the mass compilation of the source code and the execution of the mass RDBMS bind.

14. The method of claim 8, further comprising:
generating, via the computing system, a copy of the compiled source code.

15. One or more non-transitory computer readable memory media storing instructions, wherein the instructions are executable by one or more processors to:
execute, via a computing system, a CICS deployment service that displays a list of a plurality of CICS services on a graphical user interface (GUI) rendered on a display;

read, via the CICS deployment service parameters associated with deployment of the selected CICS service and source code associated with the selected CICS service from a data storage device, determine, via the computing system, one or more available servers from a plurality of servers;

execute, via the computing system, a mass compilation of the source code in a CICS environment on the one or more available servers and the parameters associated with the deployment of the selected CICS service to generate a compiled CICS service;

execute, via the computing system, a mass Relational Database Management System (RDBMS) bind batch in response to the compiled CICS service; and deploy, via the computing system, the compiled CICS services in the CICS environment in response to completion of the mass RDBMS bind batch.

16. The one or more non-transitory computer readable media of claim 15, wherein the parameters associated with the execution of the selected CICS service is one or more of: number of servers required, the type of data required, the compile number, the type of RDBMS bind required and date and time of desired deployment.

17. The one or more non-transitory computer readable media of claim 15, wherein execution of the instructions by the processor causes the computing system to:

detect one or more errors in response to executing the mass compilation of the source code or in response to executing the mass RDBMS bind.

18. The one or more non-transitory computer readable media of claim 17, wherein execution of the instructions by the processor causes the computing system to:

instruct the CICS deployment service to render the one or more errors on the GUI.

19. The one or more non-transitory computer readable media of claim 15, wherein execution of the instructions by the processor causes the computing system to:

receive from the GUI a request for a list of available servers at a specified date and time;

determine the servers available at the specified date and time;

generate a list of the determined available servers at the specified date and time; and instruct the CICS deployment service to render the list on the GUI.

20. The one or more non-transitory computer readable media of claim 15, wherein execution of the instructions by the processor causes the processor generate, via the computing system, a copy of the compiled source code.

* * * * *